3,189,461
PROCESS FOR PRODUCING QUICK-COOKING RICE

Ataullah K. Ozai-Durrani, Stuttgart, Ark.; James R. Cherry and The Chase Manhattan Bank, executors of said Ataullah K. Ozai-Durrani, deceased
No Drawing. Filed Sept. 15, 1960, Ser. No. 56,102
10 Claims. (Cl. 99—80)

This invention relates to a method of preparing a quick-cooking rice product and to the quick-cooking rice product obtained thereby.

Dry ordinary rice sold in the marketplace comprises relatively dense, hard grains of raw starch having a moisture content of about 14% or less. To prepare such rice for the table, the raw starch of the rice must be hydrated and gelatinized to a soft palatable state and the moisture content increased to about 60 to 80%. This requires cooking at least about 20 minutes in boiling water. In addition to the long cooking time, the starch is sometimes not entirely gelatinized or cooking may be continued so that an undue number of the starch cells of the rice may burst forming a viscous, sticky paste with the cooking water.

For the foregoing reasons, and others, the consumption of ordinary rice, including parboiled rice, has lagged. The invention of my United States Patent No. 2,438,939 provided the first quick-cooking rice product and it received widespread acclaim. The invention of the present invention provides a markedly different process, not dependent upon the rate of drying cooked rice, for preparing a novel quick-cooking rice product.

It is, accordingly, one of the objects of the present invention to provide a dry, quick-cooking rice product which can be prepared for consumption in a short period of time.

It is another object of the present invention to provide a dry, quick-cooking rice product consisting of enlarged grains having a porous structure capable of rapid hydration to a soft, palatable state of cooked rice.

It is a further object of the present invention to provide a novel method of producing a dry quick-cooking rice product.

Other objects will be apparent to those skilled in the art from reading the present description.

In general, the process of the present invention constitutes the following general steps:

(1) Gelatinizing and hydrating rice to a moisture content of about 60 to 80%.
(2) Freezing the gelatinized and hydrated rice.
(3) Thawing the frozen rice at a rate slow enough so that the water formed by thawing is reabsorbed by the rice.
(4) Drying the rice to a stable moisture content of about 14%, or below.

The resulting dry rice product, will cook within about three minutes when placed in boiling water or milk in a ratio of 1 part by weight of rice product to 1.25–8 parts of boiling water or milk. The specific steps of the process will be described in greater detail hereinbelow.

The rice employed as a starting material is desirably milled so that the hulls have been removed, although this is not essential and the hulls may be removed at the conclusion of any stage of the process. However, for best results milled rice is employed as it provides a product free from the undesirable taste and flavor characteristics imparted when rice is hydrated with the hulls on.

The initial gelatinizing and hydrating treatment to increase the moisture content of the rice to about 60 to 80% may be conducted in several ways. One suitable method is to cook the rice in substantially the same way that the housewife cooks milled or white rice, namely, by boiling it in water for about 20 to 30 minutes. A preferred method of gelatinizing and hydrating the rice involves first parboiling the rice under conditions of moisture and heat to increase its moisture content to about 27 to 45% moisture so that the rice grains undergo a change from a state of opacity to translucency. There are several ways in which this initial parboiling step may be conducted, such as by soaking milled rice grains in water at temperatures from above freezing to 55° C. until the rice grains contain from about 27 to 45% moisture and thereafter subjecting the resulting hydrated rice grains to steam until the grains have become translucent in character, indicating that the starch has become gelatinized.

Another specific initial parboiling treatment comprises soaking the rice in water at a temperature of about 20° C. and thereafter exposing the soaked rice to water vapor at a temperature of about 100 to 200° C. for 10 minutes.

In accordance with another specific initial parboiling treatment, the rice may be exposed directly to water vapor at a temperature of 100° C. for 10 minutes.

Rice in its translucent state may optionally be compressed by about 5 to 18% of its thickness to flatten slightly the translucent rice grains and modify their internal structures. Such a compression treatment is disclosed in my United States Patent No. 2,733,147. This compression treatment and modification of the internal structure of the rice grains enables the grains to absorb water more rapidly and fully, and converts the rice from a translucent state to an opaque state.

Rice which has been initially parboiled is then desirably soaked in water at a temperature above the freezing point up to about 98° C., preferably at a temperature of about 40° C., for a sufficient time, such as 30 minutes, until the rice absorbs sufficient water to contain between about 60 to 80% moisture by weight, and becomes milk-white, opaque and brittle. At this stage the volume of the rice has increased to about 2.5 times that of the original rice.

Rice which has had its moisture content increased to between about 60 and 80% moisture by hydration and gelatinization by means of an ordinary cooking treatment, or by the combination of parboiling followed by soaking in water, is then subjected to a freezing treatment to reduce the temperature of the rice to below the freezing point of water. Freezing temperatures of −5 to −30° C. are preferred. The rate of freezing the moisture with rice is not important and it may be frozen in as short a period as 5 minutes and as long a period as about 12 hours, or longer. As a result of the freezing treatment the rice becomes bleached and has a glistening, snow-white, frosty, completely-opaque appearance. The rice grains are plump and have increased in volume by about 10% of the volume of the rice prior to the freezing treatment. The frozen rice grains are dry to the touch and have a smooth surface.

The rice may be frozen in a number of ways. One suitable way is to pass a stream of refrigerated air over trays containing the rice grains. Trays containing the rice grains may be placed in refrigerated rooms. The rice grains may be separated in thin layers over a wire mesh conveyor belt which travels through a chamber where it is subjected to a refrigerated air blast, having a temperature such as about −30° C., which freezes the rice quickly.

The freezing treatment, in addition to causing the rice grains to expand, produces an expansion in the individual starch cells causing the cell walls to rupture somewhat, making the cell walls more amenable to rehydration when finally cooked for the table.

The frozen rice grains are next subjected to a controlled thawing treatment of the invention so that the water in the rice is thawed at a rate slow enough so that the water formed in thawing is reabsorbed by the rice grains before becoming separated from the grains. Such a thawing treatment may be conducted by slowly increasing the temperature of the rice until the melting point of the frozen moisture has been reached, such as by raising the temperature to only about 0.1° C. above the freezing point and maintaining the rice at this temperature so that the water formed on the surface of the grains as a result of the melting of the ice crystals in the rice grains is absorbed by the grains as rapidly as it forms as a result of the constant equilibrium between the melted ice and its absorption by the rice grain surfaces.

The controlled thawing of the ice in the rice grains is an essential feature of the process of the present invention. If the rate of thawing is not controlled and is permitted to proceed at a rate more rapid than the rice grains will absorb the melted ice, the rice grains will shrink, thereby losing volume and collapsing into flat grains having chalky white spots with checks and cracks on the surface of the rice. As a result of the rapid loss of moisture, such a rice will not have the optimum quick-cook characteristics of the product of the present invention, nor its superior appearance. The freezing treatment increases the volume of the rice by about 10%. If the controlled thawing treatment of the present invention is practiced, this expanded condition of the rice grains is retained on thawing and the product, after drying, is a quick-cooking rice which can be cooked by immersion in boiling water for 2 or 3 minutes.

After substantially all of the water in the rice has thawed and been reabsorbed by the rice grains without becoming separated from the grains, the rice is dried to a stable moisture content of about 14% or below. The drying of the rice can be accomplished by ordinary air drying; blowing ambient or heated air over the rice grains. The rate of drying may be such that the moisture is removed from the surfaces of the grain at a rate sufficiently faster than it can diffuse to the surfaces from the interiors of the grains so as to set the grains in their enlarged conditions and produce a porous structure therein. The latter drying process is disclosed in my prior United States Patent No. 2,438,939.

The resulting dried rice, containing about 14% or less moisture, may be stored almost indefinitely without spoilage. It will cook rapidly within about 3 minutes when placed in boiling water or milk in a ratio of about 1 part by weight of dry quick-cooking rice product to 1.25–8 parts of boiling water or milk. This quick-cooking property is made possible by the rupturing of the starch cell walls by the ice crystals as they form. By controlling the rate of thawing the swollen rice grains with their ruptured starch cells will not collapse and will remain swollen with substantially the same volume that it had before freezing.

The resulting dried quick-cooking rice product of the invention is of a uniformly snow-white color and comprises plump, enlarged, unflattened grains. The specific gravity ranges from about 0.3 to 0.6 in the dried state, depending upon the variety of rice and the particular conditions of processing. The product, when cooked, is tender and has the flavor and color of regular cooked rice.

In order more clearly to disclose the nature of the present invention, the following examples are presented. It should be understood, however, that this is done solely by way of example and is intended neither to delineate the scope of the invention nor limit the import of the appended claims.

*Example I*

Brown Blue-Bonnet variety rice from which the hulls had been removed, weighing 100 kilograms and having a volume 117.5 liters at 20° C. and containing 14% or 14 kilograms of moisture was employed as starting material. All of the grains were rather rough, most of them were dense and had protruding ridges on their surfaces. Sufficient water, having a temperature of 20° C. was added slowly and gradually until the rice would absorb no more water. After six hours all of the grains had changed to a uniform light cream color and had absorbed 26.5 kilograms of water. The grains contained 1.95 kilograms of this water on the surface and 24.55 kilograms diffused into the internal portions of the grains. As a result of this treatment, the grains glistened and the ridges on the grains had become smaller and narrower, although they retained the form and shape of the original grains. The grains were rough and were not flexible or pliable, breaking easily under finger pressure. After separating the water from the rice grains, the rice grains weighed 126.5 kilograms and measured 157 liters at 20° C. The grains were opaque to light. The rice was then exposed to water vapor at a temperature of 116° C. for 30 minutes during which the rice grains were slowly mixed. The rice was then discharged from the chamber in which it was exposed to water vapor and its temperature was 98° C. The grains had become translucent, glossy and were a little darker in color due to the partial transmission of light through them. The bran layers had apparently merged with the endosperm and had also become translucent. The grains were plump, their surface was smooth and the ridges appeared to have merged with those of the endosperm. The rice now contained 37% moisture on a dry basis, weighed 137 kilograms, and measured 187 liters at 30° C. The parboiling of the milled brown rice was complete.

The resulting parboiled rice was next subjected to a spray of water having a temperature of 40° C. for about 30 minutes, until the rice became opaque and brittle. At this stage the rice contained about 70% moisture and had expanded to about 2.5 times its original volume. Surplus water was drained from the rice grains. The rice was rapidly cooled by blowing cool air over it so that the temperature was reduced to about 5° C. in about 60 seconds. Refrigerated air at −30° C. was then passed over the rice grains so as to lower the temperature of the rice grains to about −20° C. in a period of about 10 minutes. The frozen rice grains became bleached, glistening, snowy-white, frosty, crisp and completely opaque in appearance. They had increased about 10% in volume over the volume of the grains before freezing. The frozen rice grains felt dry to the touch and had a smooth surface. Slightly warmer air, at a temperature of about 0° C. was then blown over the enlarged frozen rice grains until the temperature of the rice had gradually increased to about 0° C. in about 20 minutes. This controlled the rate of thawing of the ice crystals in the rice so that the thawing proceeded slowly enough for the rice to reabsorb the moisture as rapidly as it formed on the surfaces of the grains, without the moisture becoming mechanically separated from the grain surfaces. This prevented collapsing and flattening of the rice grains. When substantially all of the ice in the rice grains had thawed, air at a temperature of about 150° C. was passed over the rice for about 15 minutes during which time the moisture content of the rice was reduced to about 14%. The rice was then cooled by blowing ambient air of about 20° C. over the rice for 2 minutes.

The rice was uniformly snow-white and plump with a specific gravity of about 0.45 and contained 12% moisture. When the rice was placed in 1½ times its volume of cold tap water and the mixture brought to a boil in about 3 minutes, the rice was completely cooked and contained about 70% moisture. During the cooking treatment, the volume of the rice increased to about twice that of the dry product. The rice was tender and had the taste, flavor and color of regular cooked rice.

*Example II*

Blue-Bonnet variety white rice from which the hulls and bran layers had been removed by milling was cooked in boiling water for 30 minutes, at the end of which time the moisture content had increased to 70% by weight. The cooked rice, containing 70% moisture, was separated from the cooking water, then placed in thin layers over wire mesh trays. The rice was rapidly cooled by passing cold air over it so that the temperature of the rice was reduced to 5° C. in about 60 seconds. Refrigerated air having a temperature of about −30° C. was passed rapidly through the trays containing the rice grains, causing the rice to freeze rapidly. The temperature of the grains was reduced to 20° C. in a period of about 10 minutes. The rice grains took on a bleached appearance, being glistening, frosty white and completely opaque. As a result of the freezing treatment the rice had increased by about 10% in volume. The rice grains felt dry to the touch and had a smooth surface. Warmer air having a temperature of about −1° C. was blown over the enlarged frozen rice grains causing the temperature of the rice to increase rapidly until the initial vestiges of thawing began to take place. The temperature of the air was raised by about 0.1° C. and this temperature was maintained to increase very slightly the dampness which began to manifest itself on the surface of the rice grains. However, the rice grains reabsorbed the surface dampness as rapidly as it appeared. Air at approximately 0° C. was continually passed over the rice causing it to gradually thaw but at a rate no faster than the water was reabsorbed by the rice. During this controlled thawing the rice did not collapse into flat grains, but remained in a plump, expanded condition, free from chalky white spots or checks or cracks on the surface. At the completion of the thawing, the rice was dried rapidly by passing hot air having a temperature of about 150° C. over the rice. The resulting rice, containing about 14% moisture, boiled within about three minutes with 1½ times its volume of water to provide dry, white, plump, fluffy cooked rice having the flavor and taste characteristics of regular cooked rice.

EXAMPLE III

Blue-Bonnet variety white rice was steeped in water at a temperature of 20° C. until the rice would absorb no more water. The steeping water was then separated from the rice grains. The grains were opaque to light. The grains were then exposed to water vapor at a temperature of 116° C. for 30 minutes, during which time the rice grains were slowly mixed. The grains had become translucent and glossy. The grains were then subjected to slight mechanical compression by passing them through rollers spaced to flatten the grains by about 15% of their thickness. The slightly compressed rice grains were then subjected to a spray of water having a temperature of 40° C. for about 30 minutes, causing the rice to turn quickly into an opaque condition. At this stage the rice contained about 70% moisture and had expanded to about 2.5 times its original volume. The surplus water was drained from the grains and the grains were frozen, the moisture thawed by the controlled thawing treatment of the invention and thereafter dried, all in accordance with Example I.

The terms and expressions employed are used as terms of description and not of limitation, and it is not intended in the use of such terms and expressions, to exclude any equivalents of the features shown and described or portions thereof, but it is recognized that various modifications are possible within the scope of the invention claimed.

What is claimed is:

1. In a process of preparing a quick-cooking rice product the steps which comprise heating the rice in the presence of moisture under such time and temperature conditions as to gelatinize the starch substantially and increase the moisture content of the rice grains to about 60 to 80%, without causing an undue number of the starch cells to burst and form a viscous sticky paste, freezing the moisture in the rice grains while still containing about 60–80% by weight of moisture, and thawing the frozen moisture of said rice grains by the application of heat thereto at a rate not greater than that at which the rice grains will reabsorb the moisture so as to maintain the moisture content of the grains substantially constant.

2. In a process of preparing a quick-cooking rice product the steps which comprise cooking the rice in boiling water for up to thirty minutes to gelatinize the starch substantially and increase the moisture content of the rice grains to about 60 to 80%, freezing the moisture in the rice grains while still containing about 60–80% by weight of moisture, and thawing the frozen moisture of said rice grains by the application of heat thereto at a rate not greater than that at which the rice grains will reabsorb the moisture so as to maintain the moisture content of the grains substantially constant.

3. In a process of preparing a dried quick-cooking rice product the steps which comprise subjecting the rice to heat and moisture at temperatures not exceeding 200° C. for a period of time not exceeding thirty minutes to gelatinize the starch substantially and increase the moisture content of the rice grains to about 60 to 80%, freezing the moisture in the rice grains while still containing about 60–80% by weight of moisture, thawing the frozen moisture of said rice grains by the application of heat thereto at a rate not greater than that at which the rice grains will reabsorb the moisture so as to maintain the moisture content of the grains substantially constant, and thereafter drying the rice to stable moisture content of not more than about 14%.

4. In a process of preparing a quick-cooking rice product the steps which comprise parboiling the rice by soaking the rice in water at about room temperature and thereafter exposing the soaked rice to a water carrying medium at a temperature and for a period of time sufficient to gelatinize the starch substantially and increase the moisture content of the rice grains to about 27 to 45%, further hydrating the rice until it contains about 60 to 80% moisture, freezing the moisture in the rice grains while still containing about 60–80% by weight of moisture, and thawing the frozen moisture of said rice grains at a rate not greater than the rice grains will reabsorb the moisture so as to maintain the moisture content of the grains substantially constant.

5. In a process of preparing a quick-cooking rice product the steps which comprise parboiling the rice by subjecting the rice to heat and moisture to gelatinize the starch substantially and increase the moisture content of the rice grains to about 27 to 45%, compressing the rice by about 5 to 18% of its thickness, further hydrating the rice until it contains about 60 to 80% moisture, freezing the moisture in the rice grains while still containing about 60–80% by weight of moisture, and thawing the frozen moisture of said rice grains at a rate not greater than that at which the rice grains will reabsorb the moisture so as to maintain the moisture content of the grains substantially constant.

6. In a process of preparing a dried quick-cooking rice product the steps which comprise parboiling the rice by soaking the rice in water at about 20° C. and thereafter exposing the soaked rice to water vapor between 100° C. and 200° C. for ten minutes to gelatinize the starch substantially and increase the moisture content of the rice grains to about 27 to 45%, compressing the rice by about 5 to 18% of its thickness, further hydrating the rice until it contains about 60 to 80% moisture, freezing the moisture in the rice grains while still containing about 60–80% by weight of moisture, thawing the frozen moisture of said rice grains at a rate not greater than that at which the rice grains will reabsorb the moisture so as to maintain the moisture content of the grains substantially constant, and finally drying the rice to a stable moisture content.

7. In a process as in claim 1, said thawing step being carried out by slowly increasing the temperature of the rice grains until the melting point of the moisture is reached.

8. In a process according to claim 1, said thawing step being carried out by raising the temperatrue of the rice grains to 0.1° C. above the freezing point thereof and maintaining the rice grains at that temperature so that the water formed on the surface of the grains as a result of the melting of the ice crystals in the rice grains is absorbed by the rice grains as rapidly as the moisture forms.

9. In a process according to claim 1, said thawing step being carried out by blowing air at a temperature of about 0° C. over the frozen grains until the temperature of the grains is increased to slightly above 0° C.

10. In a process as in claim 9, said thawing step being carried out over a period of twenty minutes.

References Cited by the Examiner
UNITED STATES PATENTS

| | | | |
|---|---|---|---|
| 2,278,472 | 4/42 | Musher | 99—199 |
| 2,358,251 | 9/44 | Huzenlaub | 99—80 |
| 2,813,796 | 11/57 | Keneaster | 99—199 |

A. LOUIS MONACELL, *Primary Examiner.*

TOBIAS E. LEVOW, ABRAHAM H. WINKELSTEIN, *Examiners.*